United States Patent [19]

Tietze

[11] Patent Number: 4,897,014

[45] Date of Patent: Jan. 30, 1990

[54] DEVICE FOR INTERCHANGE OF TOOLS

[75] Inventor: Richard C. Tietze, Ft. Pierce, Fla.

[73] Assignee: Harbor Branch Oceanographic Institution, Inc., Ft. Pierce, Fla.

[21] Appl. No.: 240,706

[22] Filed: Sep. 6, 1988

[51] Int. Cl.$^4$ ............................................. B25J 17/00
[52] U.S. Cl. ...................................... 414/729; 29/568;
279/1 B; 294/82.28; 294/86.4; 403/225;
901/28; 901/41
[58] Field of Search .................. 414/729, 735; 901/41,
901/28, 29; 403/DIG. 6, 227, 228, 225, 290,
338; 279/1 B, 76; 285/367; 294/86.4, 82.28;
29/568

[56] References Cited

U.S. PATENT DOCUMENTS

| 4,603,998 | 8/1986 | Bober et al. | 403/325 |
| 4,652,203 | 3/1987 | Nakashima et al. | 294/86.4 |
| 4,776,232 | 10/1988 | Beyer | 901/29 |

FOREIGN PATENT DOCUMENTS 1178336  5/1959  France ............................. 294/82.28
1010474 11/1965  United Kingdom ................ 285/367

Primary Examiner—Robert J. Spar
Assistant Examiner—Donald W. Underwood
Attorney, Agent, or Firm—Carroll F. Palmer

[57] ABSTRACT

A device for interchanging tools on a mechanical manipulator arm includes a male locking cone unit, a female receptacle cone unit and a motor unit. The male locking cone unit has 3, 6 or 12 equal size balls captured in a male conical cage to extend through its external surface. The female receptacle cone unit that carries a tool includes a dished member having an internal conical surface mating with the external surface of the locking cone, a groove in the conical surface contoured to embrace portions of the balls positioned therein and lands in the groove dividing it into 8 sections of substantially equal length. The lands prevent the balls when in the groove from moving from one of the sections to another. The motor unit, which axially connects via a power take off system with the tool to operate it, is mounted on the female receptacle cone unit.

7 Claims, 3 Drawing Sheets

4,897,014

DEVICE FOR INTERCHANGE OF TOOLS

FIELD OF THE INVENTION

This application relates to devices for interchanging tools on mechanical manipulator systems. More particularly, it concerns tool interchange devices for manipulators carried by submarine vessels.

BACKGROUND OF THE INVENTION

There are a variety of devices which have mechanical arms or the like that function to manipulate tools and there is need for such devices to be able to interchange one tool for another during normal operation of the device. Robots are a prime example of such devices, see U.S. Pat. Nos. 4,281,447; 4,512,709; 4,549,846 and 4,652,203. Another example are manipulators carried by submarine vessels, see U.S. Pat. No. 4,227,853. The new devices of this invention have utility in all types of such tool exchange manipulators, but have special application for use with submarine vessel manipulators.

There are basically three types of tool interchange systems associated with submarine vessel manipulators. The first uses a small set of jaws to grasp the desired tool. The second uses a spindle indexer and the third uses a set of cones or frustums with locking elements, e.g., balls, to index the desired tool. The present invention provides the art with novel units of the third type.

Power to manipulator tools is delivered using two basic systems. In the case of the jaws-type tool holder, power to the tool is delivered in the form of hydraulic fluid through quick disconnects. In the case of spindle or cone type tool holders, the power is transmitted through a power take-off (PTO) centered in the device. Each type has advantages and disadvantages.

In the case where hydraulic disconnects are used, problems occur when the fittings are reconnected under water. Thus, small amounts of sea-water can be trapped in between the mating parts and can then be introduced into the hydraulic fluid supply. Alignment is also critical. On the positive side, hydraulics are highly versatile.

PTO's, in contrast to hydraulics, have less problems with alignment and are strictly mechanical, hence, do not affect the integrity of the hydraulic supply used for other power purposes in the overall system. On the con side, tools used with PTO's will generally need to be some type of compatible screw or rotary unit.

When using jaw-type tool indexers, several things become apparent. First, the jaws must be rotated so as to align them with the contact pads or grooves on the selected tool. Thus, X & Y alignment, rotation and angle of entry are critical in attachment of the tool to the jaw. Conversely, in the cone-type interchangers, there is a tendency to self-align the respective parts, given any play in the manipulator linkage. Axial alignment is of no importance since alignment of the cones can occur in any of 360° and since the PTO is spring loaded to engage.

In the case of spindle-type tool exchangers, interchange requires precise X & Y alignment, as well as a critical entry angle. Axial alignment, again, is not critical since it can occur in any of 360°. However, the attachment of the tool is not quite as rigid as the other two types since there must be clearance between the two mating parts. Power in the spindle-type interchangers is also transmitted to the tools using a PTO.

As there are three types of interchanger systems, there are also three types of systems used to maintain the tool in its respective holder. In the case of the jaw-type systems, hydraulic pressure must be maintained at all times to prevent the tool from disengaging.

In the case of the spindle-type holders, a pin is indexed into a groove in the spindle. Holes in the bottom of the groove also index the pin which keeps the tool from freely rotating in the holder.

The present invention avoids shortcomings of the jaws and spindle type holders by the use of a cone-type holder incorporating unique feature as disclosed hereinafter.

OBJECTS

A principal object of the invention is the provision of improved forms of tool exchange devices for manipulator arms.

Further objects include the provision of:
1. Manipulator tool exchange devices that can:
  a. Index tools in any of 360 degrees axially.
  b. Tolerate as much a ⅜" and 14 degrees of misalignment between the tool and the indexer.
  c. Positively hold the tool whether power is maintained on the system or not.
  d. Release the tool either using hydraulic power or compressed air.
  e. Operate in air or under water.
2. Such devices wherein a PTO automatically engages once activated.
3. Such devices that will allow a user to interchange tools at the hand or wrist of the manipulator without outside assistance.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects of the invention are accomplished by the provision of a device for interchanging tools on a mechanical manipulator arm which basically comprises a male locking cone unit, a female receptacle cone unit and a motor unit.

The male locking cone unit comprises a plurality of, namely, 3, 6 or 12, equal size balls captured in a male truncated conical cage within holes with extremities smaller in diameter than the diameter of the balls equidistantally spaced around and through its external surface in a common plane normal to the longitudinal axis of the cage. The holes permit portions of the balls to extend through them beyond the outer surface of the cage.

The locking cone unit also includes cam means to alternately force the balls into a fully extended, locking position in the holes and to relax the balls into a retracted, unlocking position in the holes. In a preferred embodiment, the cam means comprises a cylindrically piston mounted to slide axially within the conical cage and a mounted to slide axially within the conical cage and a spring that biases the piston into the position where the cam means forces the balls into the fully extended position. Hydraulic means are provided to axially move the piston to compress the spring.

The female receptacle cone unit comprises a dished member having an internal conical surface mating with the external surface of the locking cone. There is a groove in the conical surface positioned in a plane normal to the longitudinal axis of the dished member and contoured to embrace the extended portions of the balls of the male cone. The groove has lands in it that divide it into eight sections of substantially equal length that prevent the balls when in the groove from moving from one of the sections to another.

A tool, e.g., a claw, a scoop, etc., is fixed to the female, receptacle cone.

The motor unit includes means to axially connect with the tool to operate it and means mounting the motor unit to the male receptacle cone unit, e.g., an annular clamp and an flexible gasket.

A first axial drive shaft extends from the motor unit, a second axial drive shaft extends from the tool and there is means for connecting the first and second axial drive shafts to permit the motor unit to work the tool.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
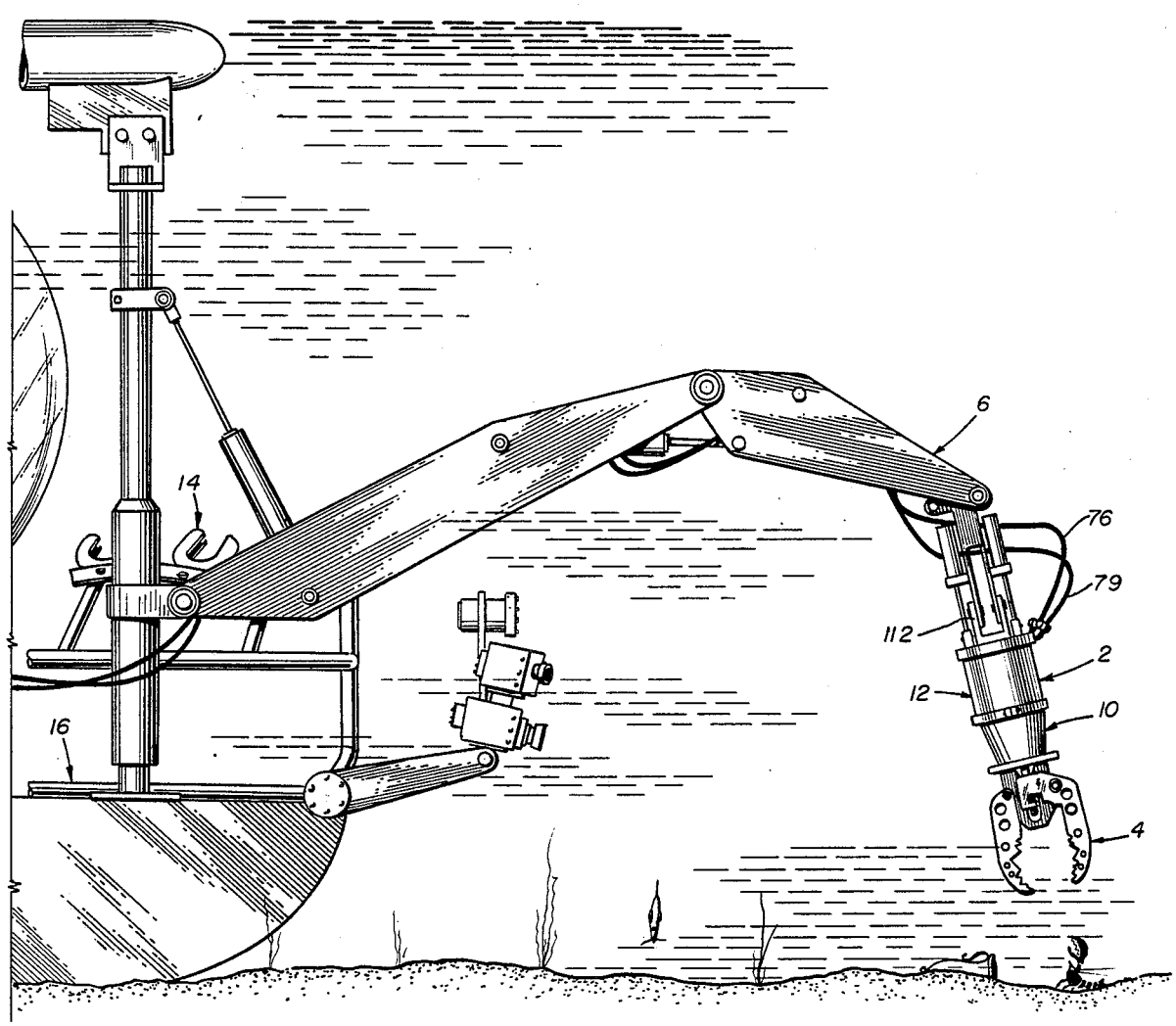
FIG. 1 is a lateral view of a submarine vessel equipped with a manipulator arm supplied with a tool interchange device of the invention.

A device 2 of the invention for interchanging a tool 4 or 4a on a mechanical manipulator arm 6 comprises a male locking cone unit 8, a female receptacle cone unit 10 and a motor unit 12.

A tool rack 14 or its equivalent mounted on a submarine vessel 16 is used in combination with the device 2 for interchange of the tools 4, 4a, etc.

In a preferred embodiment of the invention, the male locking cone unit 8 comprises six balls 18 of equal size captured in a male truncated conical cage 20 within holes 22 extremities of which are smaller in diameter than the diameter of the balls 18 equidistantally spaced around and through its external surface 24 in a common plane normal to the longitudinal axis of the cage 20. The holes 22 have portions 26 of the balls 18 extending through them beyond the surface 24 of the cage 20.

Figure 2:
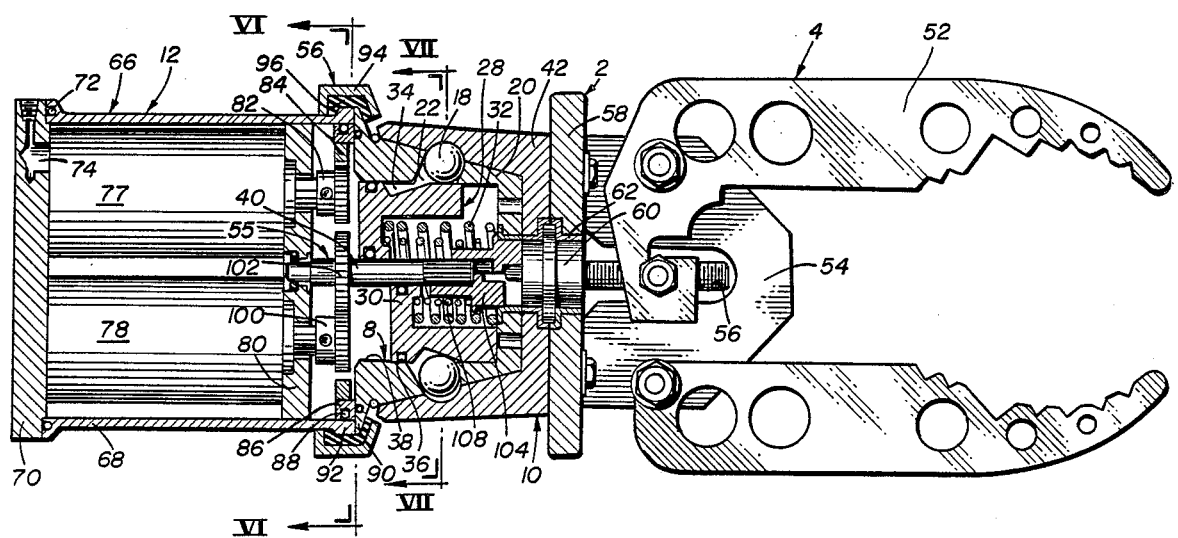
FIG. 2 is a lateral sectional view of a tool interchange device of the invention.

Cam means 28 is used to alternately force the balls 18 into a fully extended, locking position (upper half FIG. 2) in the holes 22 and relax the balls 18 into a retracted, unlocking position in the holes (lower half of FIG. 2).

Cam mean 28 includes a piston section 30 and coil spring 32 that urges the piston 30 into the ball locking position. The piston 30 has a V-shaped groove 34 in its outer surface into which the balls extend in the unlocking position of the piston 30 and a pair of O-rings 36 to form a seal between it and the inner surface 38 on one side and the splined shaft 40 on the other side.

The female receptacle cone unit 10 comprises a dished member 42 having an internal conical surface 44 mating with the external surface 24 of the locking cone 8.

The groove 46 in the conical surface 44 is contoured to embrace ball portions 26 and is positioned in a plane normal to the longitudinal axis of the dished member 42. Lands 48 in the groove 46 divide it into 8 sections 50 of substantially equal length. These lands 48 prevent the balls 18 when in the groove 46 from moving from one of the sections 50 to another.

The tool 4 comprises a pair of jaws 52 pivoted on a plate 54 so that rotation of the drive screw 56 can move the arms 52 in and out. The plate 54 is fixed, such as by welding, to a transverse plate 58 which is bolted to the dished member 42. A PTO receptacle 60 is carried in the bushing 62 carried in the base of member 42 and the plate 58. PTO receptacle 60 includes a tongue 64 that extends therefrom on the side opposite to the drive screw 56 which is fixed to the receptacle 60. As will be described later, tongue 64 cooperates with drive screw 56 to move the arms 52.

The motor unit 12 comprises means 55 to axially connect with the tool 4 to operate it, and means 56 mounting the motor unit 12 to the male receptacle cone unit 8.

The motor unit 12 includes a housing 66 formed of a cylindrical member 68 and a base plate 70 fixed together by small bolts (not shown) with sealing O-rings 72 in between. The base plate 70 includes a plurality of threaded ports 74 that connect to hydraulic lines 76 for introduction of hydraulic fluid into the housing 66 and, in turn against the base of piston 30 to move it against the bias force of spring 32 to relax the balls 18 into the unlock position.

Motor unit housing 66 encloses a first hydraulic motor 77 and a second hydraulic motor 78 held in position by the transverse plate 80. Motor 77 drives gear 82 that meshes with and drives ring gear 84 which, in turn, is fixed to ring 86. Motors 77 and 78 are driven via hydraulic lines 79 and threaded ports 74. (All lines 76 & 79 and ports 74 are not shown for the sake of clarity.)

Ring 86, which has a peripheral groove containing an O-ring 88, is fixed by small bolts 89 to the lip 90 on male cage 20 the so that when ring gear 84 turns, ring 86 and cage 20 track the movement of gear 84.

Lip 90 overlays and is pressed against the open end 92 of housing member 68 by the means 56 which consists of an annular clamp 94 and a flexible bushing 96. The clamping force of clamp 94 is regulated by the bolted flange 98 so that lip 90 is firmly pressed against the face of end 92, force of clamp 94 is regulated by the bolted flange 98 so that lip 90 is firmly pressed against the face of end 92, but not so great as to prevent lip 90 from rotating relative to end 92. With this arrangement including O-rings 88 and others as shown, the interior of housing 66 is sealed against the ambient while, at the same time, cage 20 can be rotated relative to the motor unit 12 by motor 77 via gear 82, ring gear 84 and ring 86.

Motor 78 operates the tool drive means 55. Thus, gear 100 turns gear 102 which is fixed to the shaft 40 that, in turn, is splined to PTO driver 104 having the groove 106. The tongue 64 fits into the groove 106 when to female cone unit 10 is position on the male cone unit 8 thereby enabling motor 78 via the drive chain 100, 102, 40, 104, 106, 64, 60 and 56 to operate the clamp arms 52.

The driver 104 is free to reciprocate axially on the shaft 40 to provide tolerance for engagement with receptacle 60, but is biased by spring 108 to move toward receptacle 60 to ensure full engagement of the groove 106 with the tongue 64.

A device 2 of the invention is contemplated to be used with any type of manipulator arms (MAs) that requires them to function with a plurality of separable tools, e.g., tools 4 and 4a. Obviously, different MAs will present a variety of mounting and movement arrangements for fixing the device 2 to the MAs and manipulating the device 2 once it is mounted on the MA.

Figure 3:
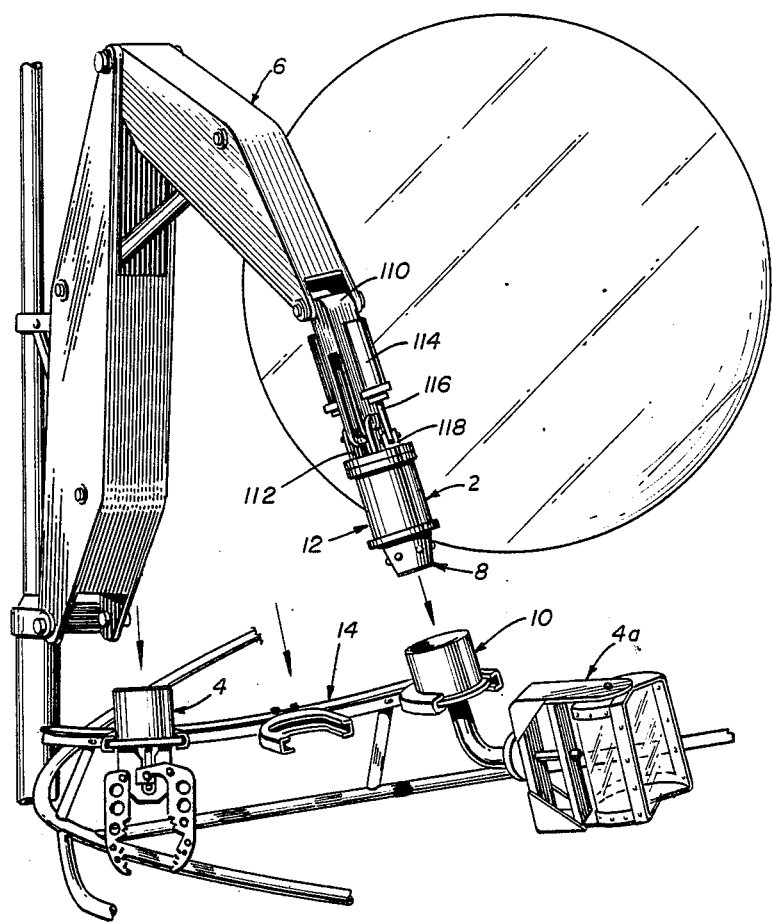
FIG. 3 is a fragmentary view similar to FIG. 1, but showing the manipulator arm in a position to take a tool from a holding rack.
Figure 4:
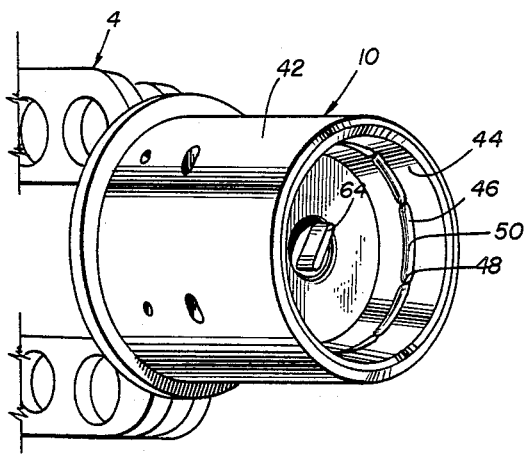
FIG. 4 is a fragmentary, isometric view of a female receptacle cone unit of the invention.
Figure 5:
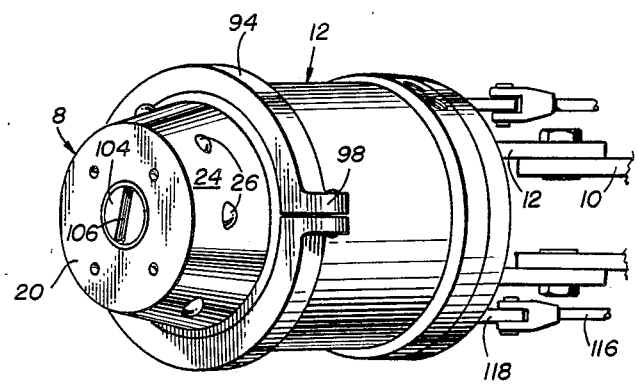
FIG. 5 is a fragmentary, isometric view of a male locking cone unit of the invention.
Figure 6:
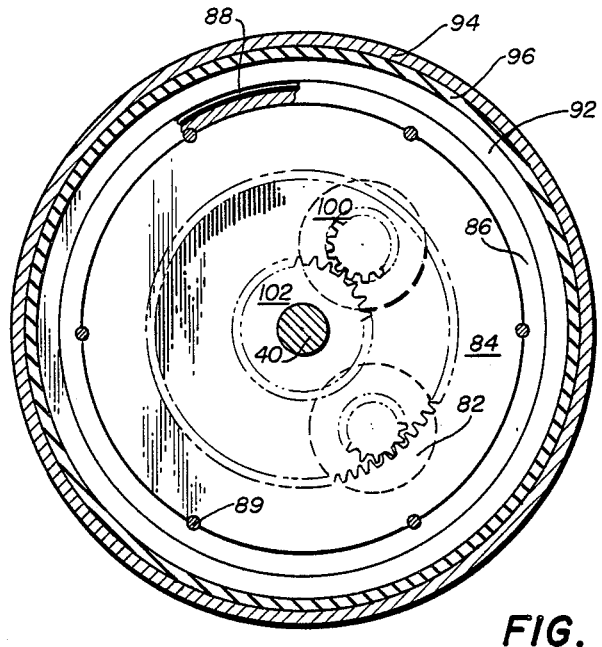
FIG. 6 is a sectional view taken on the line VI—VI of FIG. 2.
Figure 7:
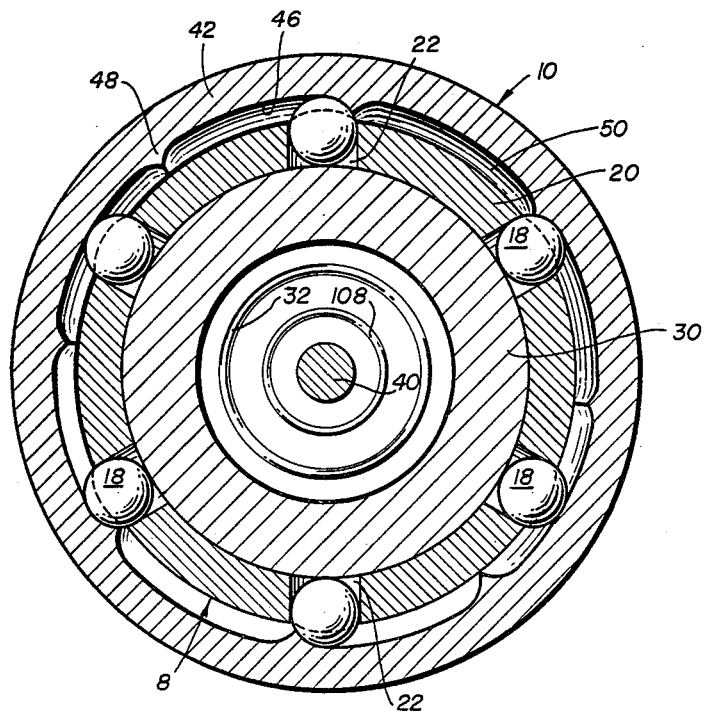
FIG. 7 is a sectional view taken on the line VII—VII of FIG. 2.

The manipulator arm 6, which exemplifies a mounting and movement arrangement for the device 2, includes a pivoted bracket 110 pinned to a saddle 112 fixed to the back of motor unit 12. Also included are hydraulic cylinders 114 with piston rods 116 pinned to lugs 118 fixed to the back of motor unit 12. Operation of cylinders 114 in conventional manner will manipulate the device 2 carrying the tool 4 or 4a to perform the desired task (see FIG. 1). When a new tool is required for another task, the arm 6 will be moved to the rack 14 (see FIG. 3) for quick and easy exchange of one tool 4 for a new tool 4a.

The embodiments of the invention in which an exclusive property or privilege is claimed are defined as follows:

1. A device for interchanging tools on a mechanical manipulator arm which comprises:
   a male locking cone unit, a female receptacle cone unit and a motor unit,
   said male locking cone unit comprising:
      a plurality of equal size balls captured in a male truncated conical cage within holes equidistantally spaced around and through its external surface in a common plane normal to the longitudinal axis of said cage, said holes having portions of said balls extending through them beyond the outer surface of said cage, and
      cam means to alternately force said balls into a fully extended position in said holes and relax said balls into a retracted position in said holes,
   said female receptacle cone unit comprising:
      a dished member having an internal conical surface mating with said external surface of said locking cone,
      a groove in said conical surface contoured to embrace said portions of said balls positioned in a plane normal to the longitudinal axis of said dished member,
      lands in said groove dividing it into eight sections of substantially equal length, said lands preventing said balls when in said groove from moving from one of said sections to another, and
      a tool fixed thereto,
   said motor unit comprising:
      means to axially connect with said tool to operate it, and
      means mounting said motor unit to said male receptacle cone unit.

2. The device of claim 1 wherein the number of said balls is 3, 6 or 12.

3. The device of claim 1 wherein said means mounting said motor unit comprises an annular clamp and a flexible gasket.

4. The device of claim wherein said cam means comprises a cylindrically piston mounted to slide axially within said cage and a spring that biases said piston into the position where said cam means forces said balls into said fully extended position.

5. The device of claim 4 having hydraulic means to axially move said piston to compress said spring.

6. A device for interchanging tools on a mechanical manipulator arm which comprises:
   a male locking cone unit, a female receptacle cone unit and a motor unit,
      six equal size balls captured in a male truncated conical cage within holes equidistantally spaced around and through its external surface in a common plane normal to the longitudinal axis of said cage, said holes having portions of said balls extending through them beyond the outer surface of said cage, and
      cam means to alternately force said balls into a fully extended position in said holes and relax said balls into a retracted position in said holes, said female receptacle cone unit comprising:
      a dished member having an internal conical surface mating with said external surface of said locking cone,
      a groove in said conical surface contoured to embrace said portions of said balls positioned in a plane normal to the longitudinal axis of said dished member,
      lands in said groove dividing it into eight sections of substantially equal length, said lands preventing said balls when in said groove from moving from one of said sections to another, and
      a tool fixed thereto,
   said motor unit comprising:
      a first axial drive shaft extending from said motor unit, a second axial drive shaft extending from said tool and means for connecting said first and second axial drive shafts, and
      means mounting said motor unit to said male receptacle cone unit.

7. A device for interchanging tools on a mechanical manipulator arm which comprises:
   a male locking cone unit, a female receptacle cone unit and a motor unit,
   said male locking cone unit comprising:
      a plurality of equal size balls captured in a male truncated conical cage within holes equidistantally spaced around and through its external surface in a common plane normal to the longitudinal axis of said cage, said holes having portions of said balls extending through them beyond the outer surface of said cage, and
      cam means to alternately force said balls into a fully extended position in said holes and relax said balls into a retracted position in said holes,
   said female receptacle cone unit comprising:
      a dished member having an internal conical surface mating with said external surface of said locking cone,
      a groove in said conical surface contoured to embrace said portions of said balls positioned in a plane normal to the longitudinal axis of said dished member,
      lands in said groove dividing it into eight sections of substantially equal length, said lands preventing said balls when in said groove from moving from one of said sections to another, and a tool fixed thereto,
said motor unit comprising:
   means to axially connect with said tool to operate it comprising a first axial drive shaft extending from said motor unit, a second axial drive shaft extending from said tool and means for connecting said first and second axial drive shafts, and
means mounting said motor unit to said male receptacle cone unit.

* * * * *